United States Patent
Genevois

(10) Patent No.: US 7,590,242 B2
(45) Date of Patent: Sep. 15, 2009

(54) SELECTIVE MULTIMEDIA DATA ENCRYPTION

(75) Inventor: Christophe Genevois, Saint Bres (FR)

(73) Assignee: SmarDTV SA, Cheseaux-sur-Lausanne (CH)

(*) Notice: Subject to any disclaimer, the term of this patent is extended or adjusted under 35 U.S.C. 154(b) by 725 days.

(21) Appl. No.: 10/508,840

(22) PCT Filed: Mar. 21, 2003

(86) PCT No.: PCT/EP03/02985

§ 371 (c)(1),
(2), (4) Date: Mar. 8, 2005

(87) PCT Pub. No.: WO03/081913

PCT Pub. Date: Oct. 2, 2003

(65) Prior Publication Data

US 2005/0141713 A1 Jun. 30, 2005

(30) Foreign Application Priority Data

Mar. 21, 2002 (DE) .................................. 102 12 656

(51) Int. Cl.
*H04N 7/167* (2006.01)
*H04M 9/00* (2006.01)
*H04L 29/06* (2006.01)
*H04J 3/22* (2006.01)
*H04J 1/00* (2006.01)
*G06F 15/16* (2006.01)

(52) U.S. Cl. .................. 380/239; 380/42; 380/242; 713/160; 370/473; 370/486; 709/225; 709/203

(58) Field of Classification Search ................ 380/212, 380/239, 37
See application file for complete search history.

(56) References Cited

U.S. PATENT DOCUMENTS

| 5,051,991 | A | | 9/1991 | Szczutkowski |
| 5,805,700 | A | * | 9/1998 | Nardone et al. ............. 380/217 |
| 6,357,046 | B1 | * | 3/2002 | Thompson et al. .......... 725/139 |
| 6,415,031 | B1 | * | 7/2002 | Colligan et al. ............. 380/200 |
| 6,502,135 | B1 | * | 12/2002 | Munger et al. ............... 709/225 |
| 6,567,471 | B1 | * | 5/2003 | Yoshinari ................ 375/240.26 |
| 6,714,650 | B1 | * | 3/2004 | Maillard et al. ............. 380/231 |
| 7,106,749 | B1 | * | 9/2006 | Darshan et al. ........ 370/395.64 |
| 2002/0146118 | A1 | * | 10/2002 | DiSanto et al. ................ 380/37 |
| 2002/0194613 | A1 | * | 12/2002 | Unger ......................... 725/118 |

(Continued)

FOREIGN PATENT DOCUMENTS

DE 199 06 449 C1 8/2000

(Continued)

*Primary Examiner*—Emmanuel L Moise
*Assistant Examiner*—Luu Pham
(74) *Attorney, Agent, or Firm*—Stuart J. Friedman

(57) ABSTRACT

A conditional access system for multimedia data is disclosed that offers acceptable security at drastically reduced requirements on hardware performance. A selectively encrypted transport stream is formed from a clear transport stream by detecting particular data packets within the clear transport stream, removing and encrypting the particular data packets with an event encryption key, and inserting the encrypted data packets into the remaining clear transport stream at insertion positions corresponding to the original positions of the particular data packets in the clear transport stream. For specific embodiments that include decryption circuitry inside a user smart card, the level of security of such system is even higher than that of conventional ones.

22 Claims, 14 Drawing Sheets

HeadEnd Component : Professional STB, CI to High speed bi-directional I/F module and PC with SC I/F and High Speed bi-directional I/F

U.S. PATENT DOCUMENTS

2003/0081776 A1* 5/2003 Candelore .................. 380/200

FOREIGN PATENT DOCUMENTS

| | | |
|---|---|---|
| EP | 0 982 951 A1 | 3/2000 |
| EP | 1 134 900 A1 | 9/2001 |
| FR | 2812147 | 1/2002 |
| GB | 2 322 994 A | 9/1998 |

* cited by examiner

Fig 1 : HeadEnd Component : Professional STB, CI to High speed bi-directional I/F module and PC with SC I/F and High Speed bi-directional I/F Fig 2 : HeadEnd Component : Professional STB, CI module including SCR, encryption by SC Fig 3 : HeadEnd Component : Professional STB, CI module including SCR, encryption by Haedend SC Fig 4 : HeadEnd Component : Professional STB, CI module including SCR, encryption by module

Fig 5 : HeadEnd Component : Professional STB including SCR, encryption by Headend SC

Fig 6 : HeadEnd Component : Professional STB including SCR, encryption by STB

Fig 7 : User decoder : STB + Selective Crypto Module + User SC

Fig 8 : User SC

Fig 9 : User decoder : User STB, standard DVB CI updated module and user SC

The process is the same as the previous one except that
- decryption is performed in a standard module updated to be able to cope with standard DVB scrambling and selective encryption
- selective decryption is still performed by the user SC Fig 10 : User decoder : User STB including SCR

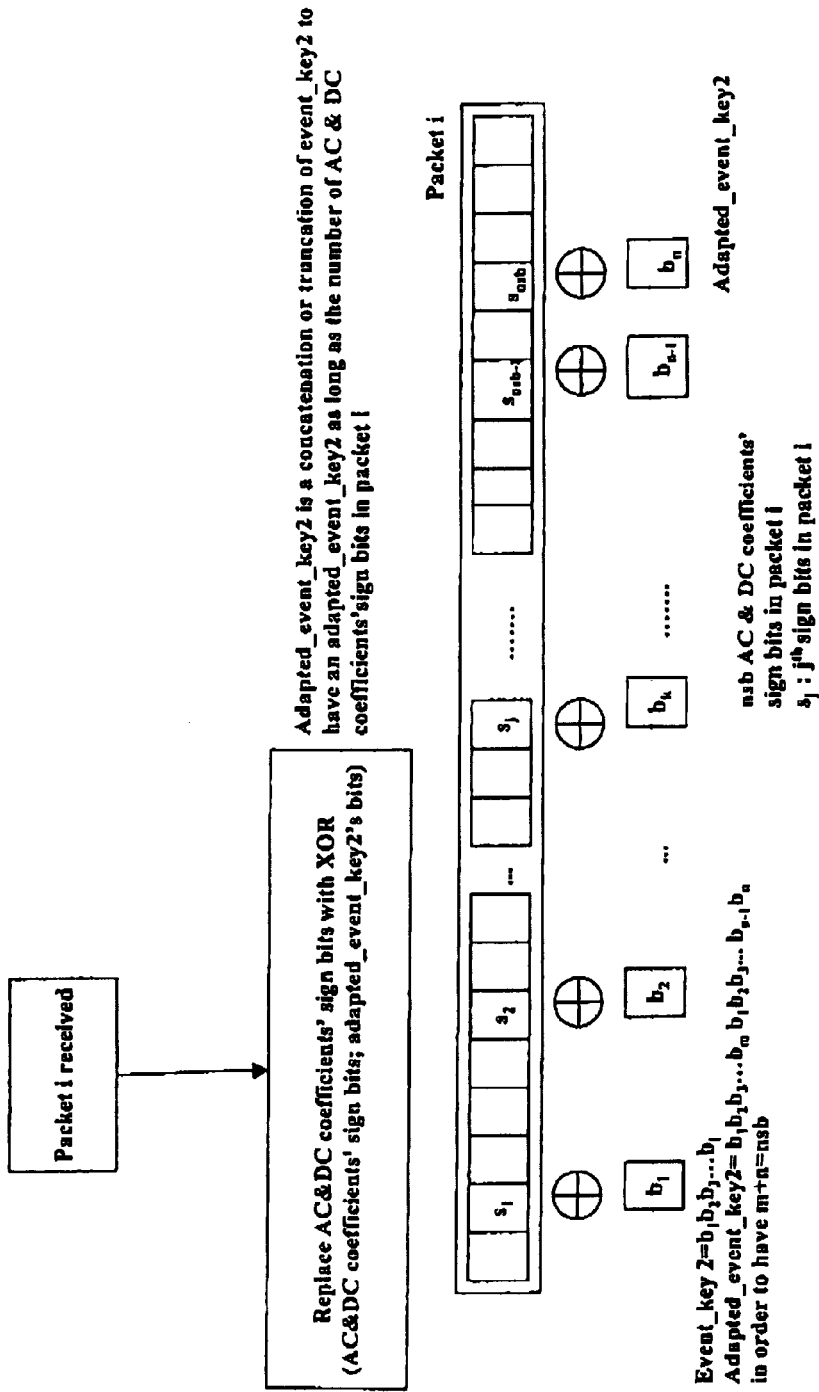

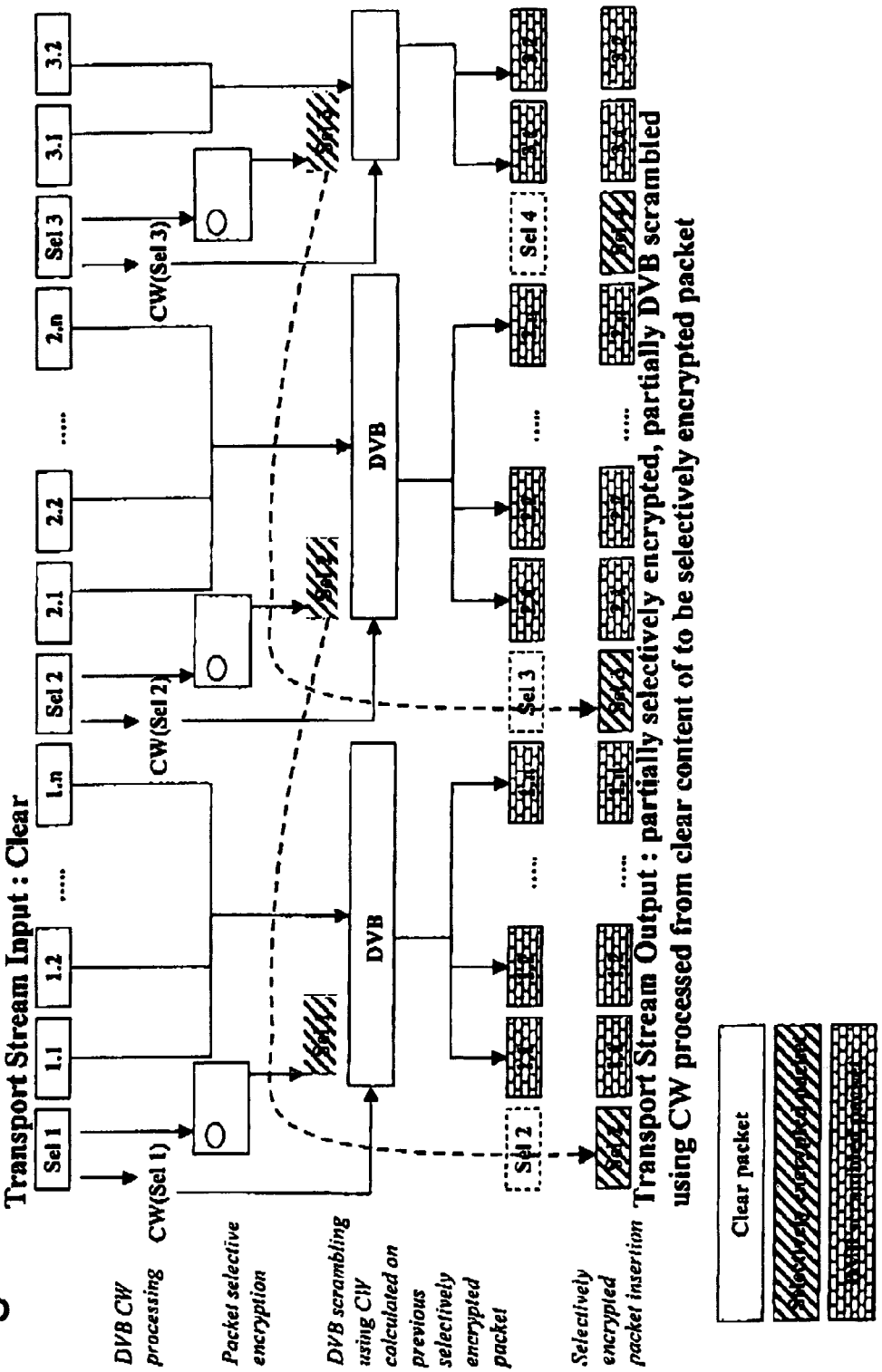

SELECTIVE MULTIMEDIA DATA ENCRYPTION

FIELD OF THE INVENTION

The present invention relates to a conditional access system wherein digitised multimedia data are transmitted in a continuous transport sum of successive data packets. The invention also relates to a method of producing a partially scrambled or corrupted transport stream from a clear transport stream containing digitised multimedia data in successive data packets.

BACKGROUND OF THE INVENTION

Data security is an important aspect in multimedia commerce. Conditional access systems (CAS) mainly rely on scrambling of a transport stream containing protected multimedia contents. In Digital Video Broadcast ("DVB"), for example, only subscribers with a conditional access module ("CAM") and a valid subscriber card (Smart Card "SC") can descramble a scrambled transport stream and obtain TV contents in the clear for application to a TV set. The conditional access module must have the capability to process an MPEG stream in real-time at a processing rate of at least about 1.5 MB/sec, thereby placing high demands of performance on the hardware used in the CAM.

SUMMARY OF THE INVENTION

The present invention provides a conditional access system for multimedia data that offers acceptable security at drastically reduced requirements on hardware performance. For specific embodiments that include decryption circuitry inside a user smart card, the level of security of such system is even higher than that of conventional ones.

According to the invention, a selectively encrypted transport stream is formed from a base transport stream by detecting particular data packets within the base transport stream, removing and encrypting the particular data packets with an event encryption key, and inserting the encrypted data packets into the remaining base transport stream at insertion positions corresponding to the original positions of the particular data packets in the base transport stream. Since only selected data packets must be processed for encryption/decryption, the amount of processing is drastically reduced.

According to a specific embodiment of the invention, a selectively encrypted transport stream is formed from a base transport stream by detecting, particular data packets within the base transport stream, removing and encrypting the particular data packets with an event's encryption key, and inserting the encrypted data packets into the remaining base transport stream at insertion positions ahead in time with respect to the original positions of the particular data packets in the base transport stream.

In one aspect of the invention, the base transport stream is a clear transport stream, i.e. data are not scrambled. By selectively encrypting the transport stream, a high level of security is achieved even if the base transport stream is in the clear, because only selected data packets must be decrypted and decryption can be done with low-performance hardware such as can be embodied in a smart-card (Smart Card)—which is inherently safe.

In another aspect of the invention, the base transport stream is a scrambled transport stream, i.e. data are scrambled in accordance with a specific standard, such as the DVB standard. By selectively encrypting the scrambled transport stream, a high level of security is added to that achieved by scrambling.

The invention uses the fact that in a typical compressed multimedia data stream such as an MPEG stream, the contents of particular data packets are propagated to successive data packets, i.e. successive data packets are dependant on contents of preceding data packets, so that by encrypting only particular data packets, many successive data packets are affected, resulting in a sufficient overall scrambling of the data stream. Given the moderate hardware requirements, decryption can be performed by available Smart Cards, enabling a hardware implementation where the security entirely resides in the Smart Card.

Further, because the key can be changed frequently and a highly efficient encryption algorithm such as, for example, DES or 3DES can be used, the security in the proposed system is sufficient for the particular needs. A possibility to enhance security is to use a non public encryption algorithm.

For low value multimedia contents, or in a pay-per-event environment, it will generally be sufficient to send a fixed event decryption key prior to actual transmission of the selectively encrypted transport stream. For higher value multimedia contents, the event decryption key can be changed frequently. In a DVB environment, for example, the event decryption keys can be transmitted with the EMMs (Entitlement Management Message) in the transport stream. A user key available in the user smart card (Subscriber Card) will be used to decrypt in the EMMs, the event decryption keys. Another possibility is to have the event decryption key available in an one-event smart card, that will be sold to users.

In the preferred embodiment of the invention, the event decryption key is transmitted to an authorised receiver provided with a "light" conditional access module. As used here, "light" means that the conditional access module will not necessarily include hardware or software decryption or descrambling resources as the decryption may be performed in the user smart card. The selectively encrypted transport stream is transmitted to the receiver. The light conditional access module detects encrypted data packets, removes the encrypted data packets from the received transport stream, decrypts the encrypted data packets with the event decryption key, and inserts the decrypted data packets into the remaining received transport stream at positions corresponding to the respective original positions of the particular data packets within the clear transport stream. Preferably, the encrypted data packets are inserted at positions a predetermined number of data packets ahead of respective original positions.

BRIEF DESCRIPTION OF THE DRAWINGS

Further advantages and features of the invention will appear from the following description of preferred embodiments with reference to the drawings. In the drawings:

FIG. 13 is a diagram illustrating a second embodiment of a method of producing a scrambled or corrupted transport stream from a clear transport stream by selective encryption; and FIG. 14 is a diagram illustrating a third embodiment of a method of producing a scrambled or corrupted transport stream from a clear transport stream by selective encryption, wherein the scrambled or corrupted transport stream consists of selectively encrypted packets and DVB scrambled packets.

DESCRIPTION OF THE PREFERRED EMBODIMENTS

Figure 1:
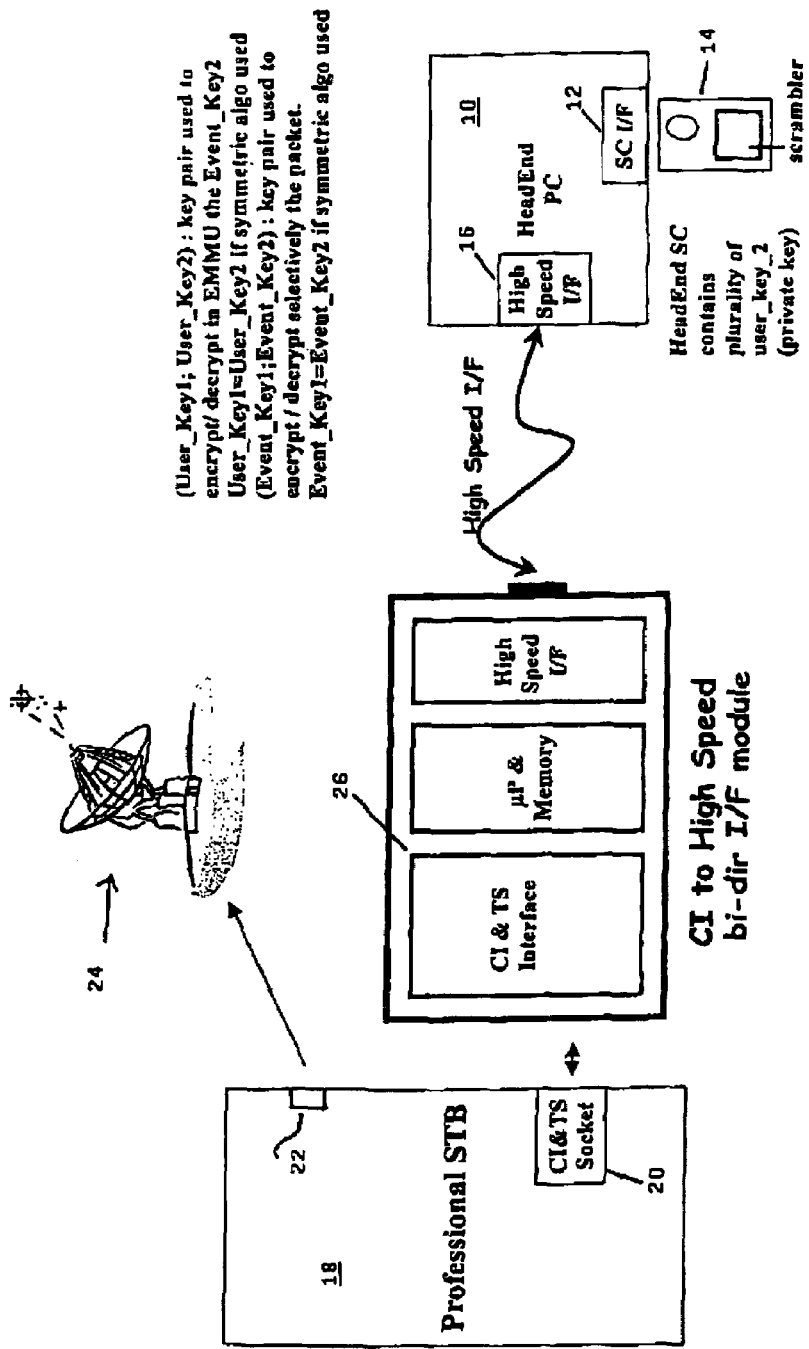
FIGS. 1 to 6 are block diagrams with descriptive legends for different embodiments of a head-end equipment for producing selectively encrypted data streams containing digitised multimedia data.
Figure 2:
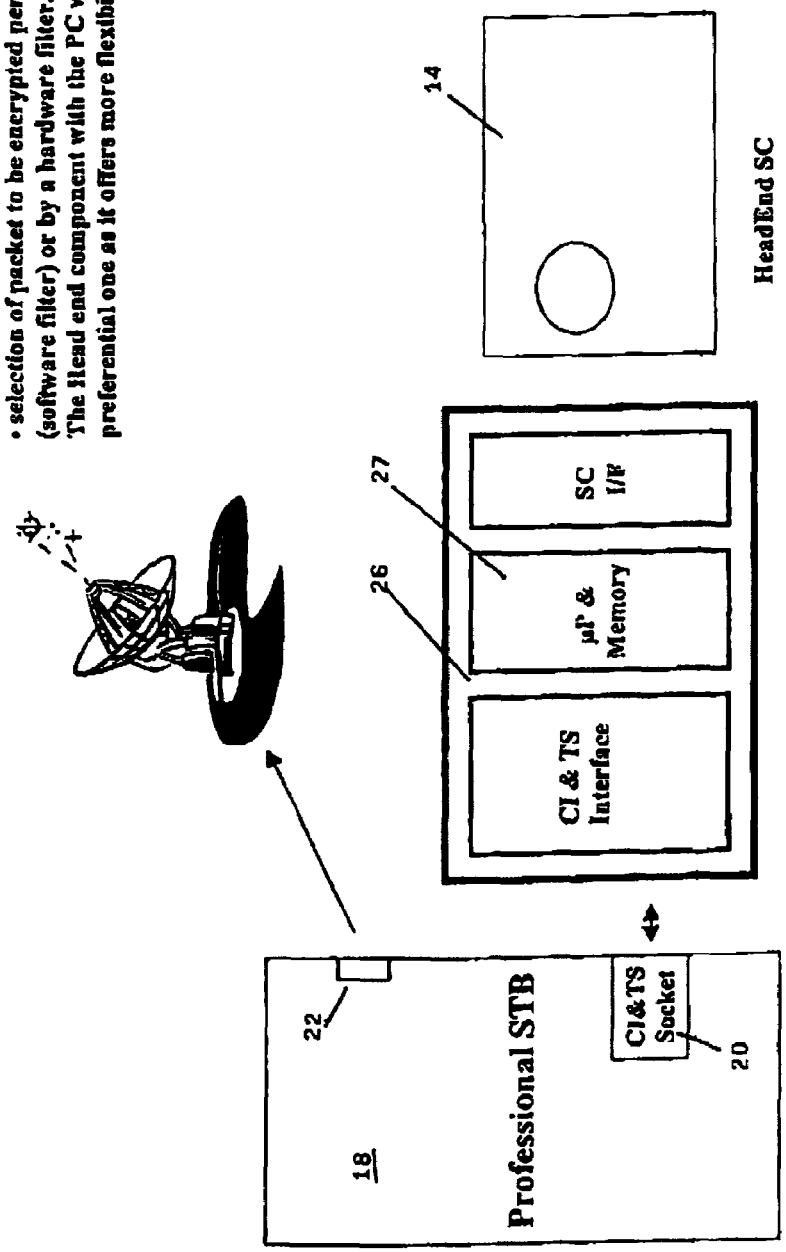

With reference now to FIG. 1, a first embodiment of a head-end component is shown for producing a selectively encrypted transport stream containing digital multimedia data Specifically, the component includes a head-end PC (Personal Computer) 10 with an interface 12 for an SC (Smart Card) 14 and a serial high speed bi-directional communication interface 16 (e.g. a 1394 or a USB2 interface). The SC 14 has an internal processor with scrambling or encrypting capability and a safe memory for storing a plurality of private user keys. The headed component further includes a professional (transmitter) STM (Set-Top-Box) 18 that has CI (Common Interface) and TS (Transport Stream) interface 20 and an RF port 22 for connection to a satellite link 24. The head-end component finally includes an interface module 26 to establish a high-speed serial connection between interface 20 of STB 18 and interface 16 of PC 10. Module 26 is preferably a PC card according to the PCMCIA standard and includes a microprocessor and a memory in addition to a CI and TS interface and a high-speed serial interface.

Figure 11:
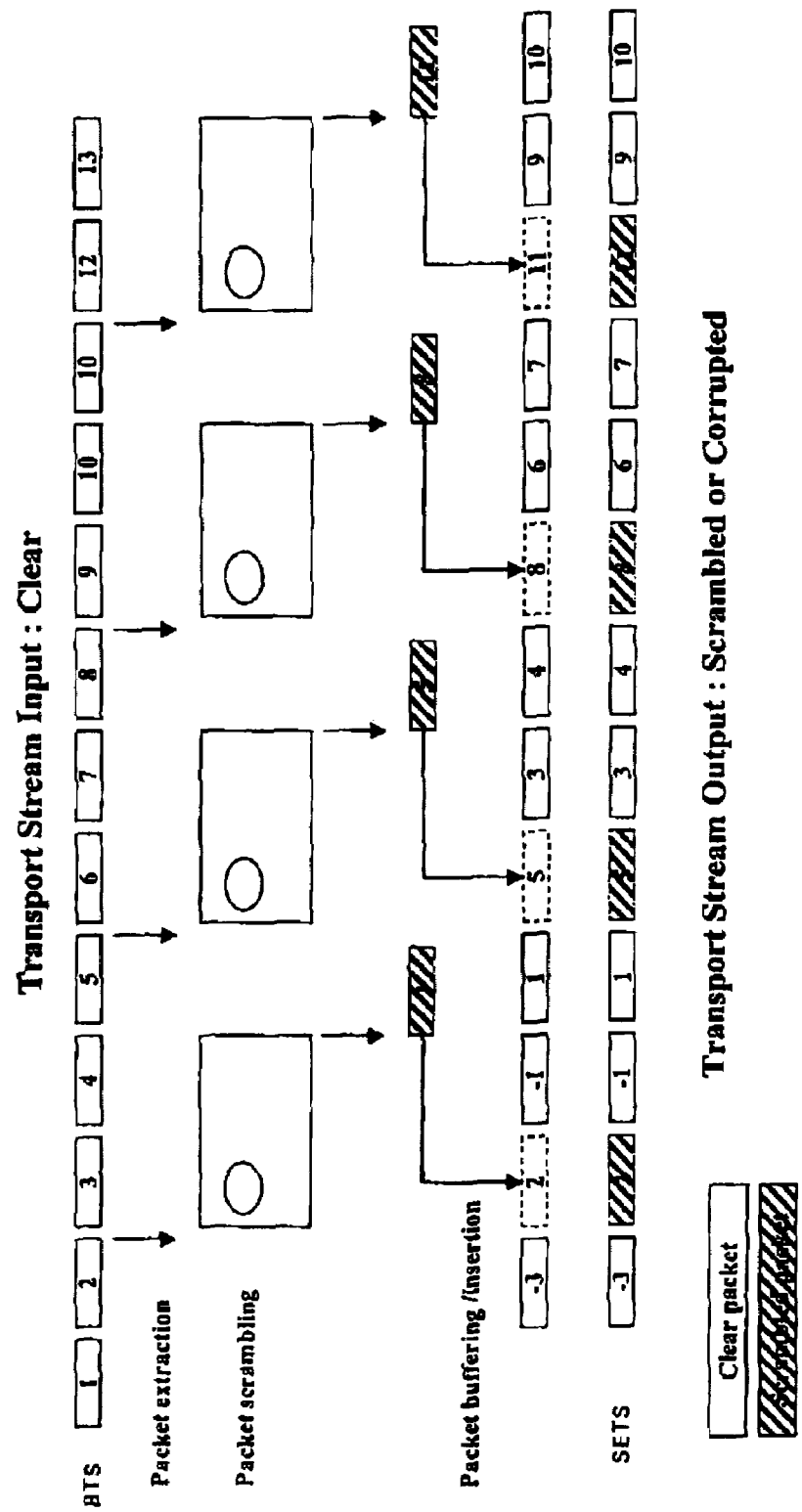
FIG. 11 is a diagram illustrating a first embodiment of a method of producing a scrambled or corrupted transport stream from a clear transport stream by selective encryption.

With reference to FIG. 11, to generate a selectively encrypted transport stream SETS from a base transport stream BTS consisting of successive digital data packets numbered 1, 2, . . . 13 . . . , selected data packets are extracted from the BTS and encrypted, or scrambled, with circuitry on SC 14, using an "event key". In the FIG. 1 embodiment, the BTS is a clear digital transport stream consisting of successive data packets and available within the PC 10. In FIG. 11, the encryption or scrambling step is referred to as "packet scrambling". It should be understood that the base transport stream BTS can be a clear TS as indicated in FIG. 11, or a scrambled transport stream and, in particular, a conventional DVB-scrambled transport stream.

The keys used in the selective encryption/scrambling method include a user key pair and an event key pair, as indicated in FIG. 1, and each key pair can be symmetric or asymmetric, as also indicated in FIG. 1. The user keys (user_keys_2) are stored in the memory of SC 14 in the case of private keys (public and private key pairs). The user keys are transmitted with the EMM in a DVB environment for decryption of the event keys used for the selective encryption/scrambling.

In the next step, referred to as "Packet buffering/insertion" in FIG. 11, the encrypted or scrambled data packets are inserted into the buffered transport stream at positions in time ahead of corresponding positions in the original BTS. For example, scrambled data packet #2 is inserted between data packet # −3 and data packet # −1, and now available position between data packets #1 and #3 is filled with scrambled data packet #5. As a result, a selectively encrypted, or scrambled, transport Stream SETS is provided, as shown in FIG. 11.

The SETS is communicated to the STB 18 via module 26 for broadcast transmission over satellite link 24, as seen in FIG. 1.

Figure 7:
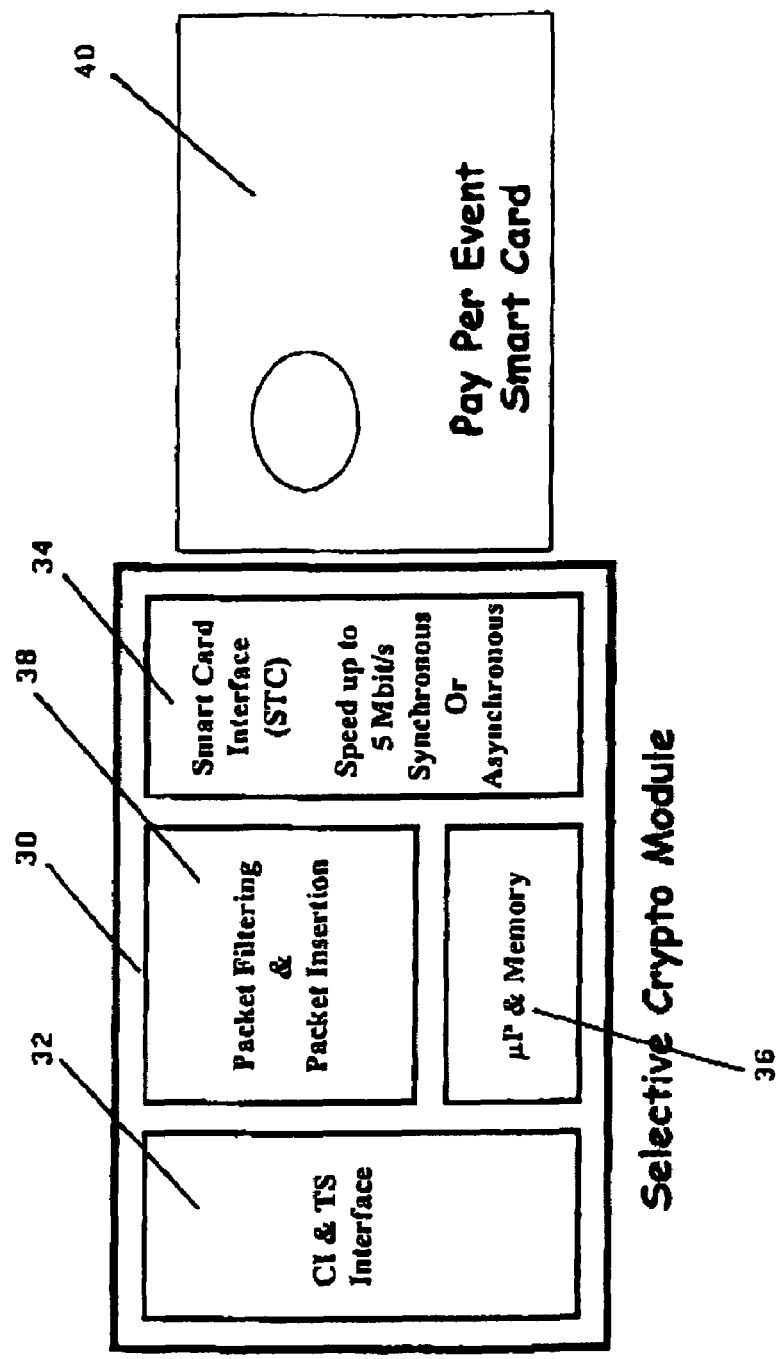
FIGS. 7 to 10 are block diagrams with descriptive legends for different embodiments of a user equipment for decoding selectively encrypted data streams containing digitised multimedia data.
Figure 12:
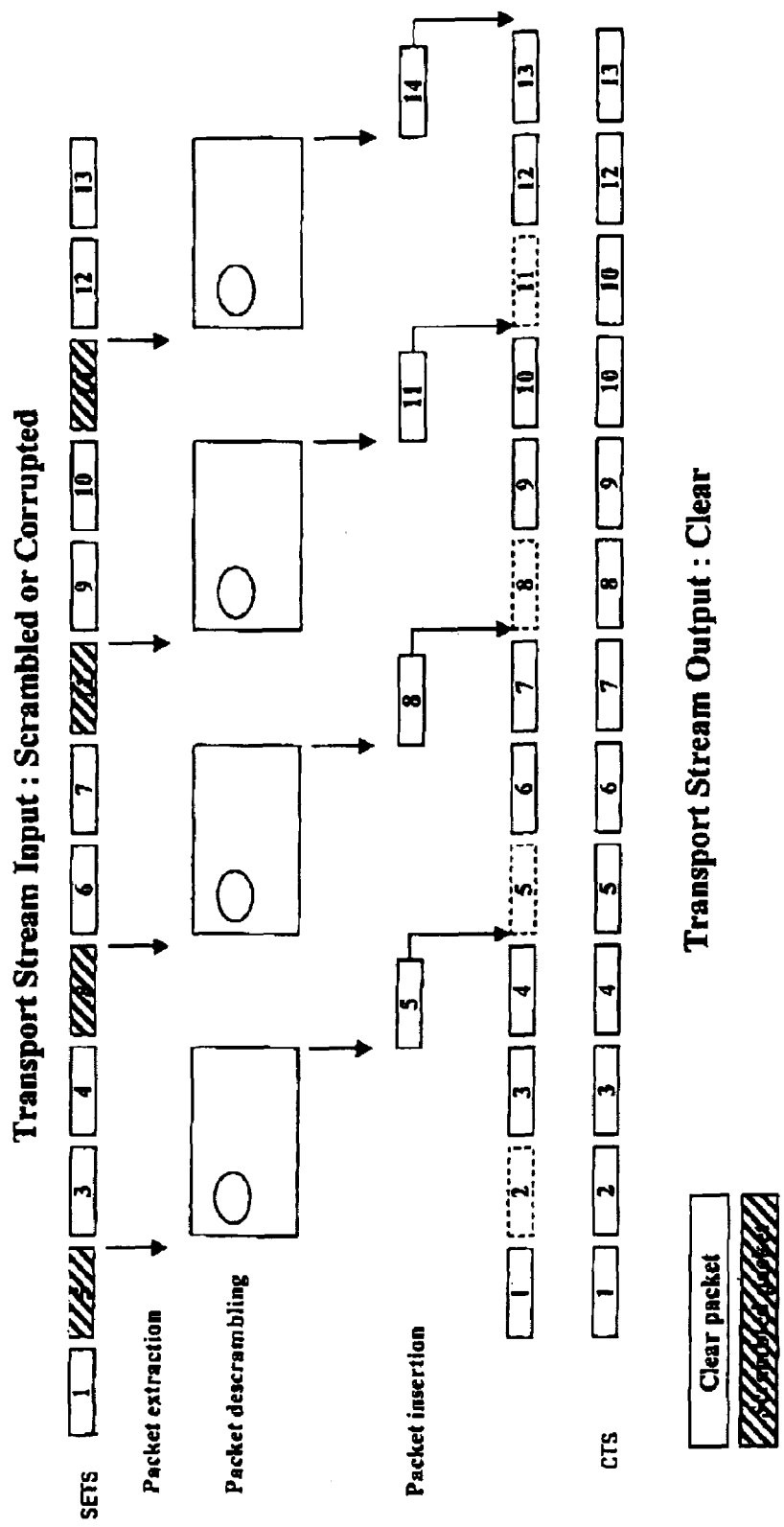
FIG. 12 is a diagram illustrating a method of producing a clear transport stream from a scrambled or corrupted transport stream produced with the method of FIG. 11.

With reference to FIG. 7, a ft embodiment of a user-end component is shown for recovering in accordance with the method illustrated in FIG. 12, from a selectively encrypted transport stream, as may be produced with the component in FIG. 1 and in accordance with the FIG. 11 method, a clear sport stream.

The user component shown in FIG. 7 includes a PC card module 30 referred to as a "Selective Crypto Module", that includes a CI & TS interface 32 (Common Interface and interface for Transport Stream), an incorporated smart-card reader 34, a microprocessor with memory unit 36 and a packet filtering and insertion logic 38. The user component works with a smart-card 40 to be inserted in the reader 34 and referred to in FIG. 7 as a "Pay Per Event Smart Card". Of course, this is just one of many possible scenarios in a protected DVB environment.

The module 30 is inserted into a CI slot of a conventional Set-Top-Box that has the capability of receiving a selectively encrypted/scrambled transport stream such as produced by the equipment in FIG. 1, having the encrypted/scrambled transport stream converted into a clear stream by means of the module 30, and forwarding a video/audio to signal an appliance such as a TV set.

With reference to FIG. 12, a selectively encrypted transport stream SETS is received, and encrypted data packets are extracted for decryption or descrambling by circuitry on SC 40. The user key for such decryption is stored in a safe memory of SC 40. This step is referred to as "Packet descrambling" in FIG. 12. As a next step, the descrambled data packets are inserted in the buffered transport stream at locations corresponding in time to the original positions in the base transport stream BTS. As a result, a clear transport stream CTS is obtained.

In this embodiment, the selective decryption is performed with circuitry on the SC 40. This is possible because the selective encryption proposed here can be dealt with on the user side with a moderate hardware performance requirement, as is typically embodied in a smart card. In other embodiments of the invention, however, the selective decryption may be performed by circuitry incorporated in, or software/firmware residing in, module 30.

Figure 3:
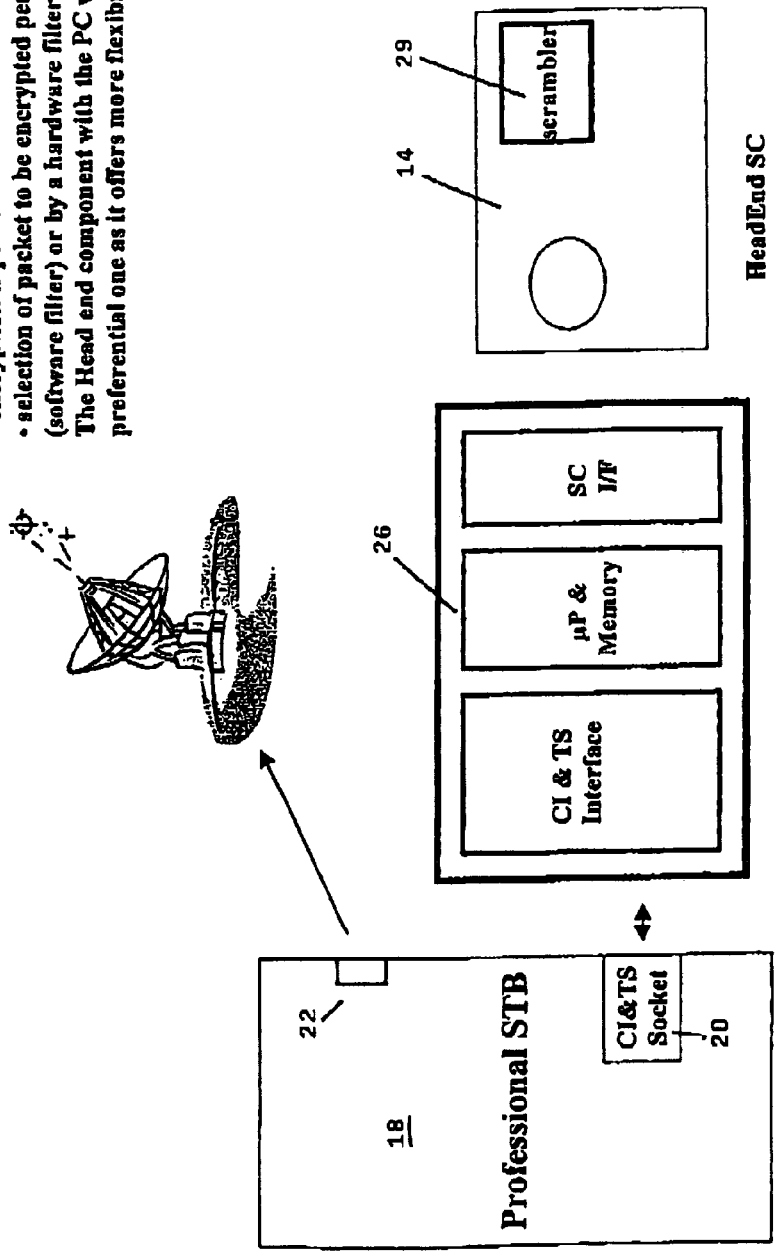
Figure 4:
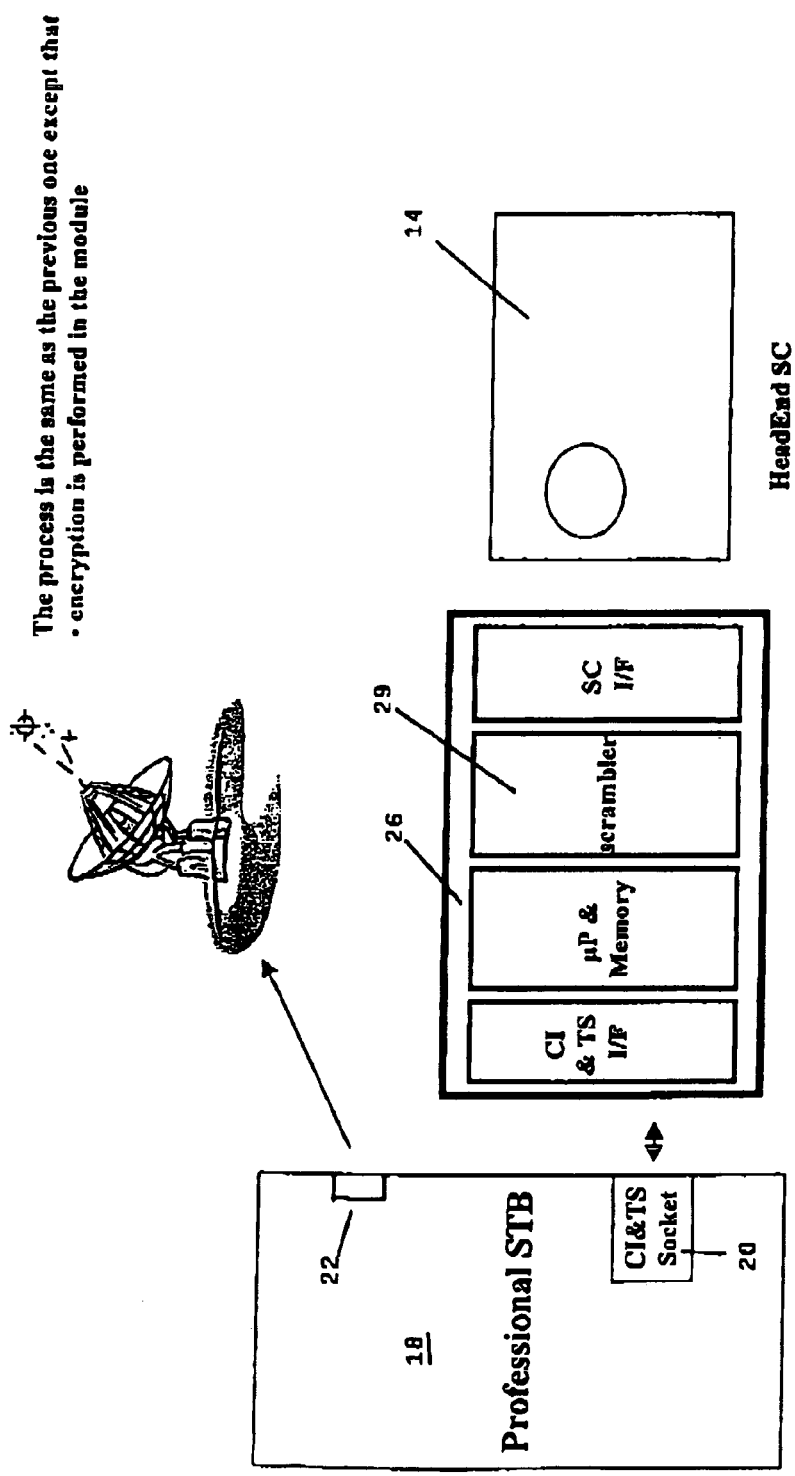
Figure 5:
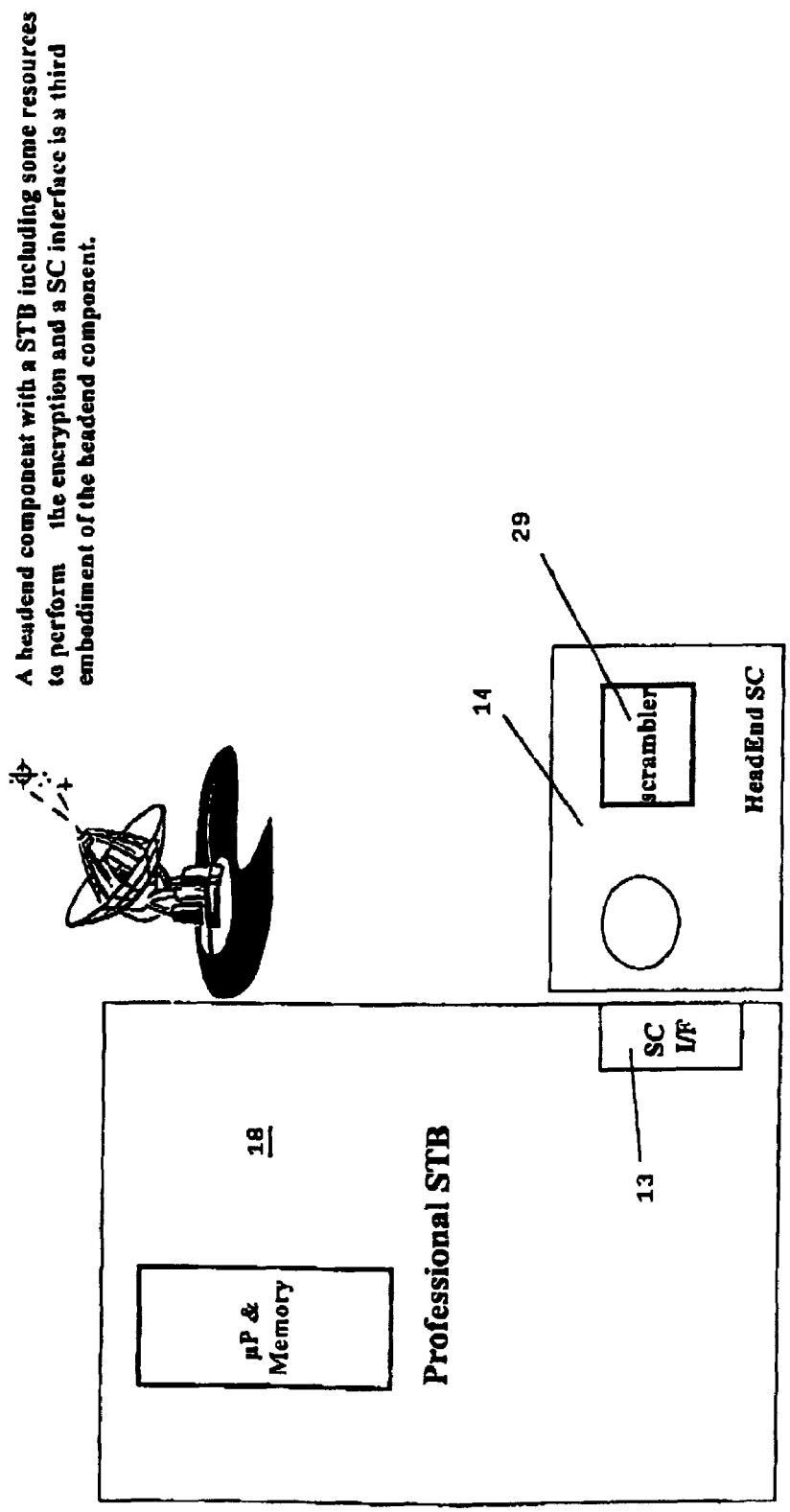
Figure 6:
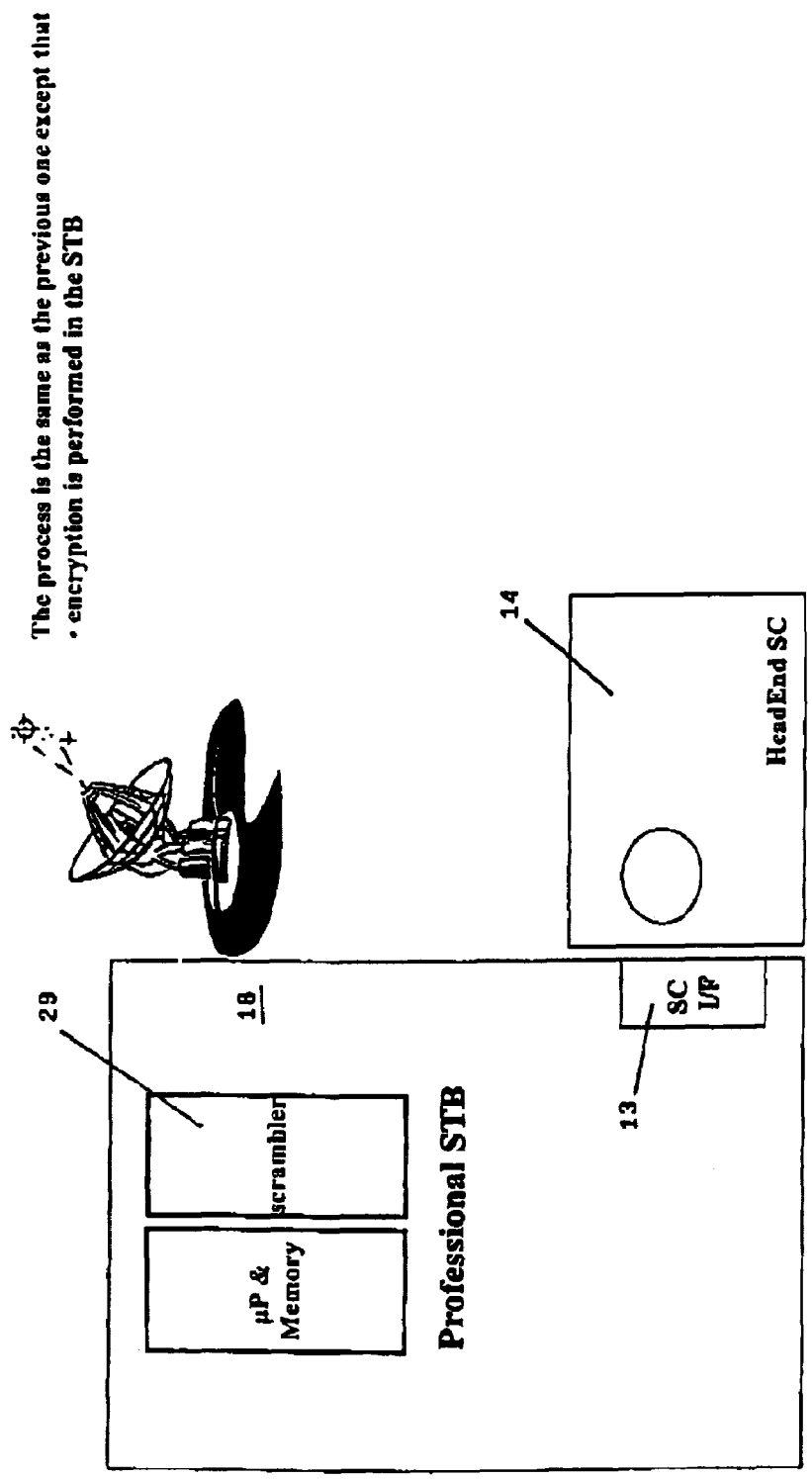

With reference to FIGS. 2 to 6, different embodiments of the head-end component are shown but they all may have the same functionality as that in FIG. 1. Specifically, the FIG. 1 embodiment works without a PC, and the encryption of the selected data packets is performed in module 26 which is a PC card smart card reader for SC 14. Alternatively, the encryption may be performed by circuitry on SC 14, as shown in FIG. 3 where the SC 14 has a scrambler 29. The selection of the data packets to be encrypted is either performed by software executed by a microprocessor 27 within module 26 or by a hardware filter incorporated in module 26. In FIG. 4, the scrambler 29 is shown as incorporated in module 26. In FIG. 5, the functionality of module 26 is incorporated in STB 18, which is equipped with a smart card reader 13 for SC 14. The scrambler 29 is incorporated in SC 14. In FIG. 6, the only difference over FIG. 5 is that the scrambler 29 is incorporated in STB 18.

Figure 8:
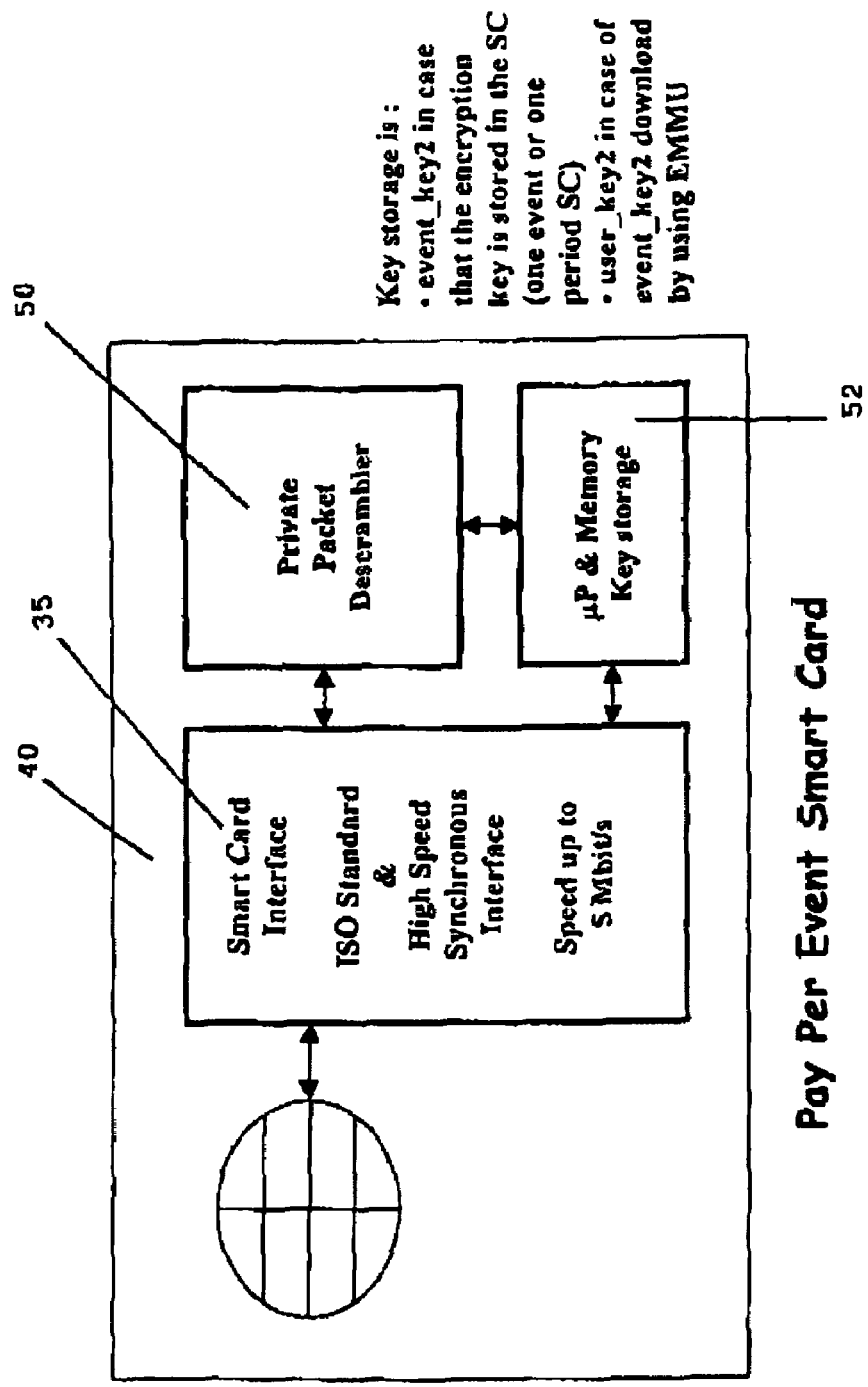

With reference to FIG. 8, details of the user smart card (SC) 40 (see FIG. 7) are shown. SC 40 has an interface 35 that corresponds to interface 34 in module 30. It also has a private packet descrambler 50 for the decryption of the selectively encrypted data packets, and a microcomputer 52 with a microprocessor and a memory for storing an event key, or a user key in case of an event key to be down-loaded with the EMMUS. In FIG. 8, it is assumed that SC 40 is a "Pay Per Event Smart Card".

Figure 9:
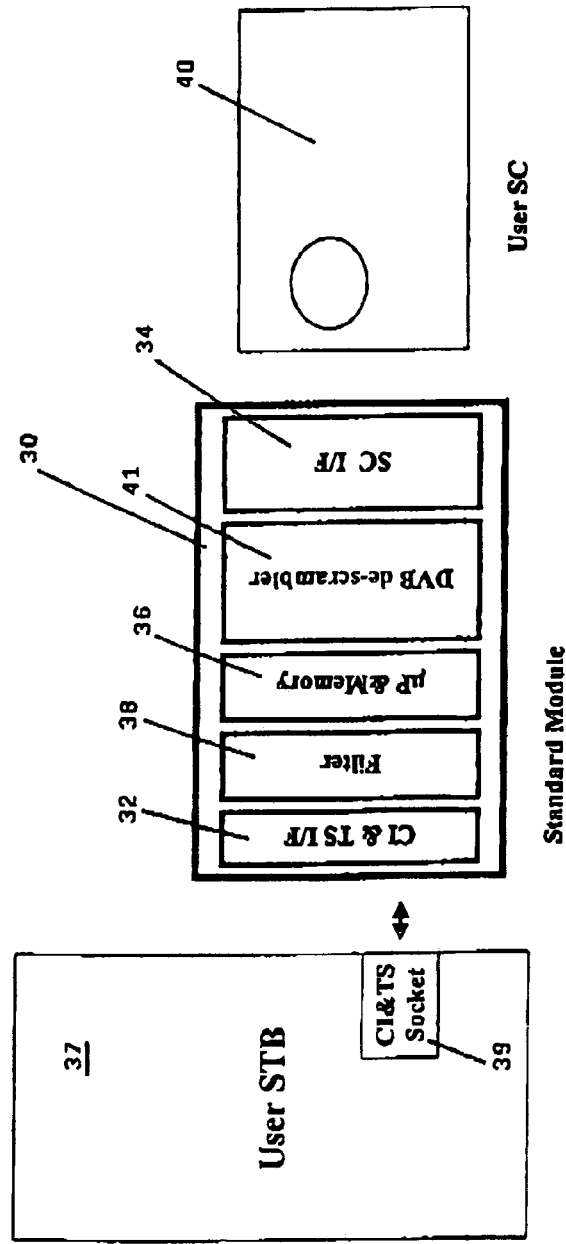
Figure 10:
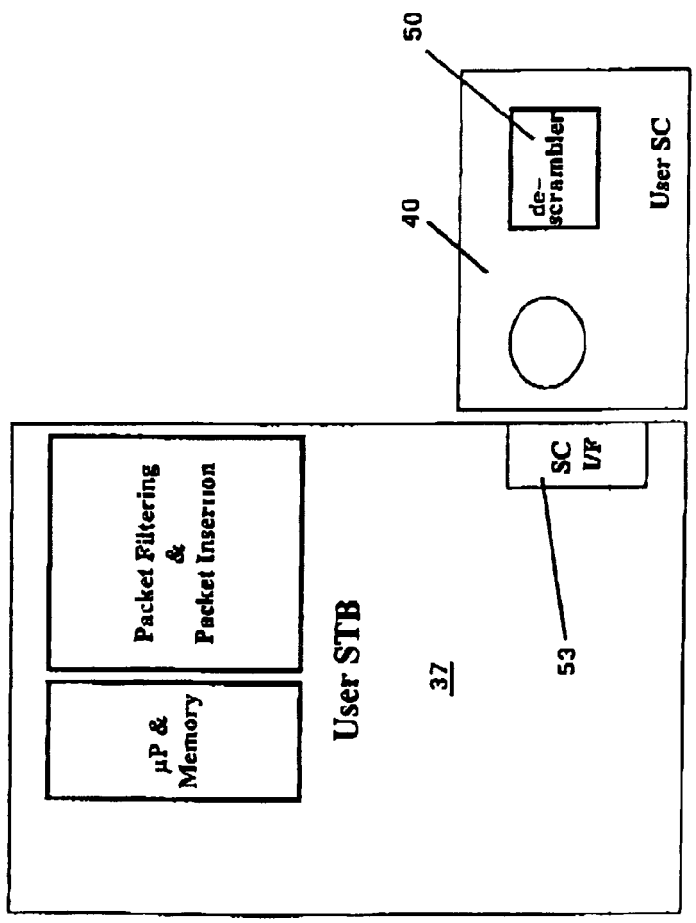

With reference to FIGS. 9 and 10, different embodiments of the user component are shown but they all may have the same functionality as that in FIG. 7. Specifically, in the FIG. 9 embodiment, the user component includes a user Set-Top-Box (STB) 37 with an interface 39 for module 30. Module 30 has incorporated therein a conventional DVB descrambler 41. In this embodiment, decryption of the selected data packets is performed on SC 40 while DVB descrambling is performed on module 30 which is a conditional access module (CAM) upgraded to cope with the needs of selective data packet encryption. In the FIG. 10 embodiment, the functionality of module 30 has been incorporated in STB 37, as is known from conventional embedded conditional access systems. Accordingly, STB 37 has an interface 53 for SC 40. Decryption of the selectively encrypted data packets is still performed by a circuitry on SC 40, i.e. by descrambler 50, Having disclosed basic embodiments of the invention, further improvements are apparent from FIGS. 13 and 14.

In FIG. 13, the processing of a data packet for selective encryption is shown in detail. The data packets selected here for encryption are preferentially those the contents of which are propagated to succeeding data packets in an MPEG transport stream so that a relatively powerful scrambling effect is achieved wit a relatively reduced percentage of encrypted data packets. This is an important factor if the decryption of the selectively encrypted data packets is to be performed on a smart card with inherently moderate processing capacity, but with an inherently high level of security.

In FIG. 14, the generation of a partially DVB-scrambled and selectively encrypted transport stream is illustrated. As is easily seen, all data packets other than the selectively encrypted data packets are DVB-scrambled. Specifically, a clear content is partially selectively encrypted and partially DVB scrambled, the DVB keys being processed from the clear content of selectively encrypted packet.

By this way, a stream completely scrambled without using EMM to broadcast DVB keys is provided. The scrambled stream contains the CW that are processed from a selectively encrypted packet that has been decrypted. The level of security is still high as those control words could only be recovered if the "one-event card" is available to decrypt the selectively encrypted packets. This solution has the advantage that the stream is completely scrambled and that the content's broadcast is independent from EMMs so independent from broadcasting companies (as TPS, Canal + . . . etc).

In FIG. 14, the process to have the scrambling stream is illustrated:
  to-be-selectively-encrypted packets are sel 1, sel 2, sel 3
  To-be-DVB-scrambled packets are 1.1, 1.2, . . . , 1.n, 2.1, 2.2, . . . , 2.n, 3.1, 3.2 . . .
  CW(Sel i) is the control word calculated firm clear Sel i content and that will be used to scramble packets i.1, i.2, . . . , i.n
  As soon as CW (Sel i) is processed, Sel i is encrypted in the head end Smart Cud (for example)
  CW(Sel i) is fed to the DVB scrambler to processed the scrambled i.1, i.2, . . . , i.n
  Encrypted Sel i is inserted in advance to i.1, i.2, . . . , i.n
  When a user STB receives the scrambled stream,
  it will send encrypted packet Sel i to the smart card,
  The smart card will decrypt Sel i,
  The smart card will process CW(Sel i),
  Sel i will be sent to the DVB descrambler, The DVB descrambler will descramble packets i.1 , i.2, . . . , i.n with Sel i.

The invention is claimed is:

1. A conditional access method wherein digitized multimedia data are transmitted in a continuous transport stream of successive data packets, comprising the steps of:
  selectively forming an encrypted transport stream from a base transport stream by detecting particular data packets within the base transport stream, removing and then encrypting the particular data packets with an event encryption key having a corresponding event decryption key,
  inserting the encrypted data packets into the remaining base transport stream at insertion positions ahead in time with respect to the original positions of the particular data packets in the base transport system, and
  transmitting the event decryption key to a receiver either with the selectively encrypted data stream or via a mobile telecommunication network prior to broadcasting the multimedia data.

2. The method of claim 1, further comprising the step of buffering the non encrypted data packets while the particular data packets are encrypted.

3. The method of claim 1, wherein the event decryption key is transmitted in a Digital Video Broadcast (DVB) environment in specific Entitlement Management Messages (EMMs) protected by a user encryption key, the corresponding user decryption key being provided in the Control Access System (CAS), on a user smart card or on a user Subscriber Identification Module (SIM).

4. The method of claim 1, wherein said encrypted data packets are inserted at positions which are a predetermined number of data packets ahead of their respective original positions.

5. The method of claim 1, wherein the event decryption key is frequently changed.

6. The method of claim 1, wherein the event decryption key is a fixed key distributed on a pay-per-event basis.

7. The method of claim 1, further comprising the step of providing the event decryption key which is encrypted using a user encryption key, and providing the corresponding user decryption key to an authorized user.

8. The method of claim 1, wherein the encrypting step further comprises the step of producing at a head-end encoder the selectively encrypted data stream, wherein the head-end encoder includes a Common Interface (CI) that in turn has a smart card (SC) interface for a smart card that has encryption circuitry thereon.

9. The method of claim 1, wherein the encrypting step comprises the step of producing at a head-end encoder the selectively encrypted data stream, wherein the head-end encoder includes a Common Interface (CI) for a Personal Computer (PC) card module that has encryption circuitry thereon.

10. The method of claim 1, wherein the encrypting step further comprises the step of producing at a head-end encoder selectively encrypted data stream, wherein the head-end encoder includes a (PC) with an interface for a chip card containing an event encryption key or a user encryption key, the encryption being processed in the PC.

11. The method of claim 1, wherein the encrypting step further comprises the step of producing at a head-end encoder selectively encrypted data stream, wherein the head-end encoder includes an encoder module with a Common Interface and Transport Stream (CI&TS) interface to a professional Set-Top-Box (STB).

12. The method of claim 1, wherein the base data transport stream is a clear data stream.

13. The method of claim 1, wherein the base transport stream is a DVB-scrambled data stream.

14. The method of claim 1, wherein all data packets other than the selectively encrypted data packets are Digital Video Broadcast scrambled (DVB-scrambled).

15. The method of claim 1, wherein every nth data packet of the transport stream is encrypted, n being a fixed number.

16. The method of claim 1, wherein every $n^{th}$ data packet of the transport stream is encrypted, n being a variable number.

17. The method of claim 16, wherein the variable number n is randomly variable.

18. The method of claim 16, wherein the variable number n is variable as a function of data packet contents.

19. The method of claim 1, further comprising the steps of, at the receiver side:
receiving the event decryption key by an authorized receiver having a conditional access system,
receiving selectively the encrypted transport stream by the receiver,
detecting the encrypted data packets by the conditional access system,
removing the encrypted data packets from the received transport stream,
decrypting the encrypted data packets with the event decryption key, and
inserting the decrypted data packets into the remaining received transport stream at positions corresponding to the respective original positions of the particular data packets within the base transport stream.

20. The method of claim 19, comprising the step of storing by the conditional access system into a buffer memory, clear data packets while decrypting an encrypted data packet.

21. The method of claim 19, wherein said conditional access system includes a chip card with decryption circuitry thereon.

22. The method of claim 21, wherein the chip card is a Subscriber Identification Module (SIM) card.

* * * * *

UNITED STATES PATENT AND TRADEMARK OFFICE
CERTIFICATE OF CORRECTION

PATENT NO. : 7,590,242 B2  
APPLICATION NO. : 10/508840  
DATED : September 15, 2009  
INVENTOR(S) : Christophe Genevois Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Fourteenth Day of December, 2010

David J. Kappos  
*Director of the United States Patent and Trademark Office*